United States Patent
Jakobsson et al.

(10) Patent No.: US 9,407,614 B2
(45) Date of Patent: Aug. 2, 2016

(54) SYSTEMS AND METHODS FOR DETERMINING AN AUTHENTICATION ATTEMPT THRESHOLD

(71) Applicant: EBAY INC., San Jose, CA (US)

(72) Inventors: Bjorn Markus Jakobsson, Portola Valley, CA (US); Nachum Shacham, Palo Alto, CA (US)

(73) Assignee: PAYPAL, INC., San Jose, CA (US)

(*) Notice: Subject to any disclaimer, the term of this patent is extended or adjusted under 35 U.S.C. 154(b) by 6 days.

(21) Appl. No.: 13/800,733

(22) Filed: Mar. 13, 2013

(65) Prior Publication Data

US 2014/0282866 A1 Sep. 18, 2014

(51) Int. Cl.
*H04L 29/06* (2006.01)

(52) U.S. Cl.
CPC .................................. *H04L 63/08* (2013.01)

(58) Field of Classification Search
CPC ... H04L 63/08; G06F 17/30958; G06F 21/41; G06F 21/316; G06F 21/554; G06F 21/552; G06F 21/55
See application file for complete search history.

(56) References Cited

U.S. PATENT DOCUMENTS

| | | | | |
|---|---|---|---|---|
| 2008/0034412 A1* | 2/2008 | Wahl | ....................... | G06F 21/41 726/8 |
| 2008/0155651 A1* | 6/2008 | Wasmund | ............. | G06F 21/316 726/2 |
| 2011/0185401 A1* | 7/2011 | Bak | ................... | G06F 17/30958 726/5 |
| 2014/0096210 A1* | 4/2014 | Dabbiere | ......................... | 726/5 |

* cited by examiner

*Primary Examiner* — Tae Kim
*Assistant Examiner* — Shu Chun Gao
(74) *Attorney, Agent, or Firm* — Haynes & Boone, LLP

(57) ABSTRACT

Systems and methods are provided for determining an authentication attempt threshold. Authentication systems often have predetermined authentication attempt thresholds that may not be sufficient for some users and do not necessarily provide any increased security. Systems and methods provided for determining an authentication thresholds described herein may determine the authentication threshold based on certain factors in a user's authentication attempt history that may provide information about a user's probability of a successful authentication to provide additional security for users more likely to successfully authenticate while providing additional assistance to users who may be less likely to successfully authenticate.

15 Claims, 5 Drawing Sheets

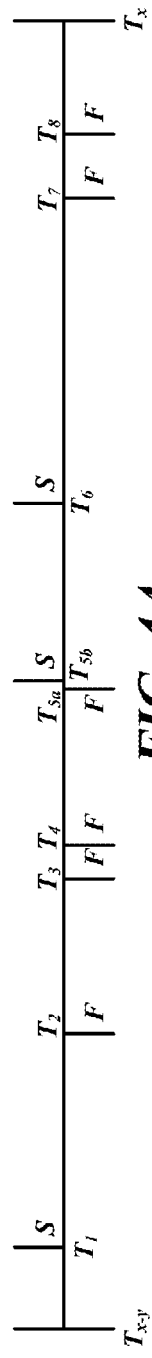
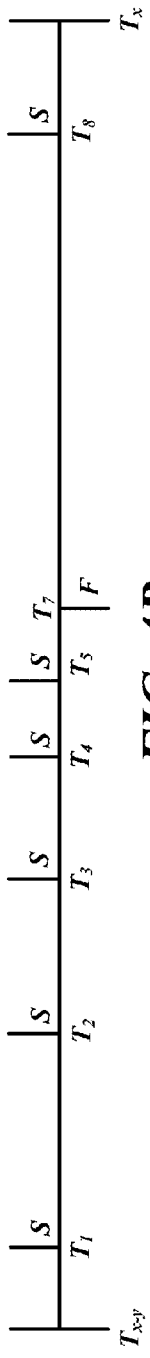
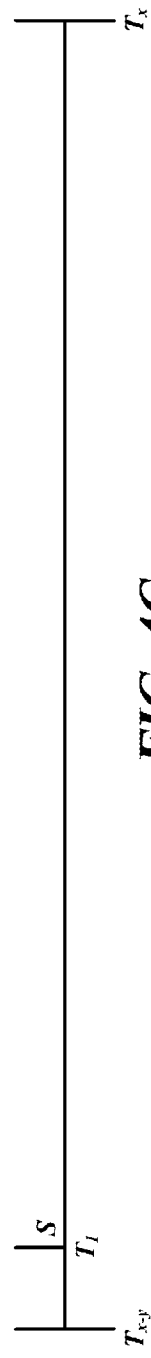
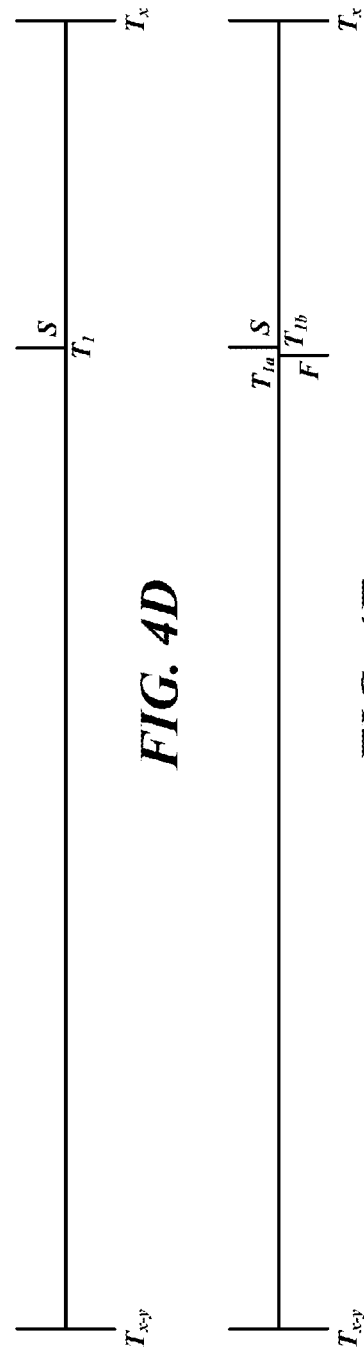
FIG. 4A  FIG. 4B  FIG. 4C  FIG. 4D  FIG. 4E

SYSTEMS AND METHODS FOR DETERMINING AN AUTHENTICATION ATTEMPT THRESHOLD

BACKGROUND

1. Technical Field

Embodiments disclosed herein are related to systems and methods for determining an authentication attempt threshold. In particular, systems and methods disclosed herein may determine an authentication attempt threshold based on a probability of successful authentication determined by a recentness of a successful authentication, a number of successful authentication attempts over a predetermined sequence, and a number of overall successful authentication attempts.

2. Related Art

Internet users typically have multiple accounts with multiple websites, each having specific credentials that are required for a user to authenticate to the website and access services and features provided by the website. The user is required to remember specific credentials for specific websites and, in some cases, multiple credentials for a single website. This means that a user may not always remember the credential required for a website, particularly if it is a website that they have not visited recently. However, to protect users from brute force attacks, many websites and other secure networked servers typically set limits on a site-specific authentication attempts within a particular time period before a security action is taken. For example, a user trying to authenticate to a website to access their account will have a set number of authentication attempts before the website freezes the account, the user has to do a password reset, and/or the user may have to contact the website provider to unfreeze their account. In many conventional examples, the threshold is three (3) attempts. However, the threshold is arbitrary, and does not maximize usability and security. For some users that frequent a website, three attempts are probably unnecessary. For users that may visit the website very sporadically, three attempts may not be enough. Moreover, the users that frequent the website may have more invested in their account with the website and, thus, may have more to lose from an attacker gaining access to their account that may cost the user and even the website provider more than it would for a sporadic or infrequent user.

Accordingly, there is a need for systems and methods that determine an authentication attempt threshold based on a probability of successful authentication. In particular, there is a need for systems and methods that determine the authentication threshold by analyzing a recentness of a successful authentication, a number of successful authentication attempts over a predetermined sequence, and a number of overall successful authentication attempts.

BRIEF DESCRIPTION OF THE FIGURES

FIGS. 4A-4E are user authentication attempt sequences, consistent with some embodiments.

Figure 1:
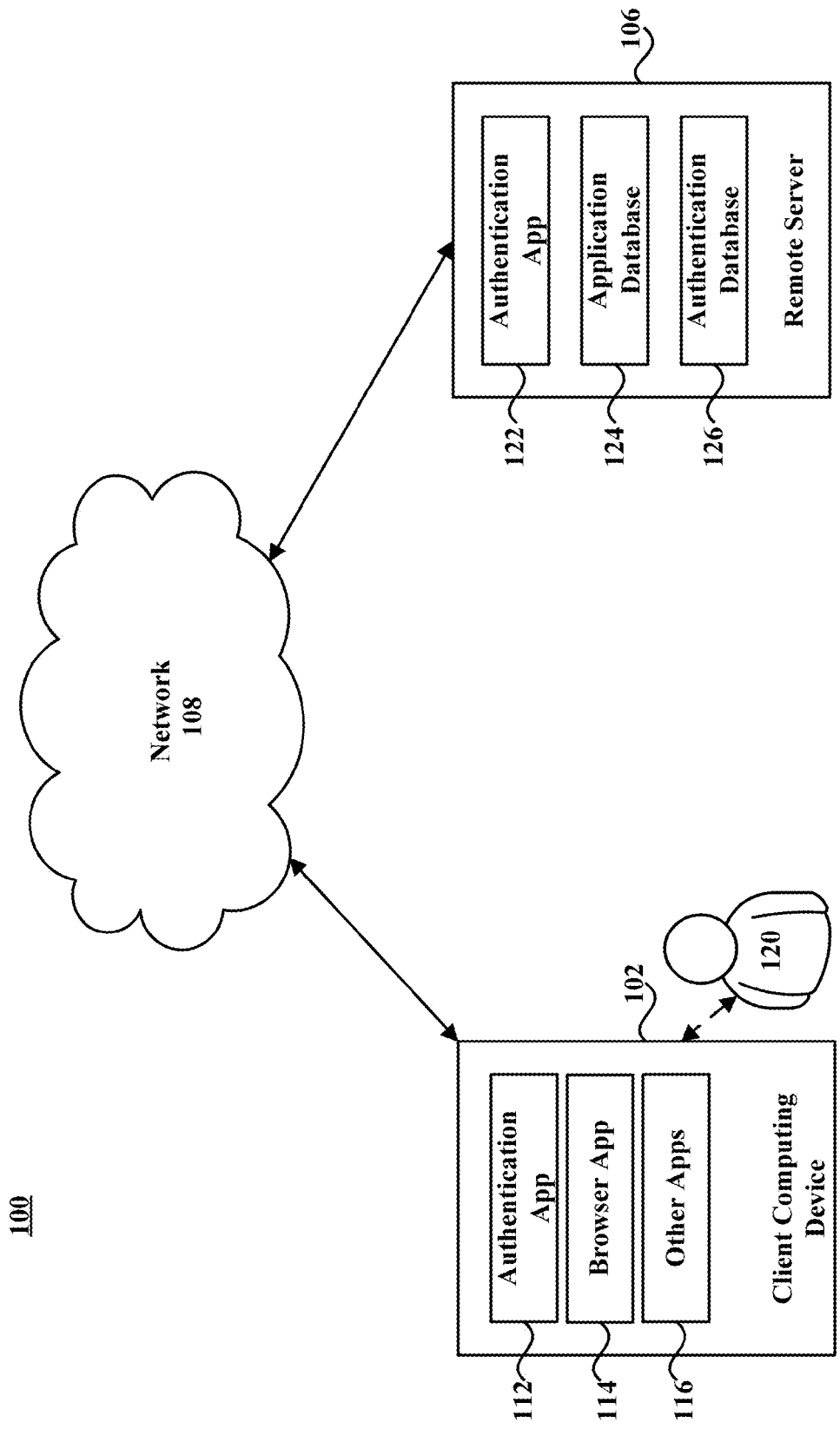
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Consistent with some embodiments, there is provided, a system for determining an authentication attempt threshold. The system includes a network interface component configured to receive a request for authentication and a memory configured to store an authentication attempt history. The system also includes one or more processors configured to: determine an estimate of probability of successful authentication based on at least one sequence of authentication attempts in the authentication attempt history, determine the authentication attempt threshold based on the probability, and determine whether the request for authentication is successful.

Consistent with some embodiments, there is also provided a non-transitory computer-readable medium having instructions for execution by one or more processors that, when executed, cause the one or more processors to perform a method for determining an authentication attempt threshold. The method includes steps of receiving an authentication request, accessing an authentication attempt history, determining an estimate of a probability of successful authentication, the estimate based on at least one sequence of authentication attempts in the authentication attempt history, and determining the authentication attempt threshold based on the estimate of probability.

Consistent with some embodiments, there is further provided a non-transitory computer-readable medium having instructions for execution by one or more processors that, when executed, cause the one or more processors to perform a method for determining an authentication attempt threshold. The method includes steps of receiving an authentication request, accessing a user authentication attempt history, and determining an authentication attempt threshold based on at least one of a recentness of at least one successful authentication and a number of successes in at least sequence of authentication attempts in the user authentication attempt history.

These and other embodiments will be described in further detail below with respect to the following figures.

FIG. 1 is a block diagram of a networked system 100, consistent with some embodiments. System 100 includes a client computing device 102 and a remote server 106 in communication over a network 108. Remote server 106 may be a payment service provider server that may be maintained by a payment provider, such as PayPal, Inc. of San Jose, Calif. Remote server 106 may be maintained by other service providers in different embodiments. Remote server 106 may also be maintained by an entity with which sensitive credentials and information may be exchanged with client computing device 102. Remote server 106 may be more generally a web site, an online content manager, a service provider, such as a bank, or other entity who provides content to a user requiring user authentication or login.

Network 108, in one embodiment, may be implemented as a single network or a combination of multiple networks. For example, in various embodiments, network 108 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 108. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices. Consistent with some embodiments, client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. For example, such instructions may include authentication app 112 for authenticating client computing device 102 to remote server 106. Consistent with some embodiments, authentication app 112 may be a mobile authentication app, which may be used to authenticate user 120 to remote server 106 over network 108. Authentication app 112 may include a software program, such as a graphical user interface (GUI), executable by one or more processors that is configured to interface and communicate with the remote server 106 or other servers managed by content providers or merchants via network 108.

Client computing device 102 may include a browser app 112. Browser app 112 may be a mobile browser app, which may be used to provide a user interface to permit a user 120 to browse information available over network 108. For example, browser application 112 may be implemented as a web browser to view information available over network 108. Browser application 112 may include a software program, such as a graphical user interface (GUI), executable by one or more processors that is configured to interface and communicate with remote server 106 or other servers managed by content providers or merchants via network 108. For example, user 116 is able to access websites to find and purchase items, as well as access user account information or web content. Client computing device 102 may also include other applications 116 as may be desired in one or more embodiments to provide additional features available to user 120, including accessing a user account with remote server 106. For example, applications 116 may include interfaces and communication protocols that allow the user to receive and transmit information through network 108 and to remote server 106 and other online sites. Applications 116 may also include security applications for implementing client-side security features, programmatic client applications for interfacing with appropriate application programming interfaces (APIs) over network 108 or various other types of generally known programs and/or applications. Applications 116 may include mobile apps downloaded and resident on client computing device 102 that enables user 120 to access content through the apps.

Remote server 106 according to some embodiments, may be maintained by an online payment provider, which may provide processing for online financial and information transactions on behalf of user 120. Remote server 106 may include at least authentication application 122, which may be adapted to interact with authentication app 112 of client computing device 102 over network 108 to authenticate client computing device 102 to remote server 106. According to some embodiments, authentication app 122 send information over network 108 to client computing device 102 for use by authentication app 112 for authenticating user 122 to remote server 106. Such information may include an authentication attempt threshold corresponding to a maximum number of authentication attempts that user 120 is permitted before a security action is performed. Consistent with some embodiments, authentication app 122 may determine an authentication attempt threshold based, in part, on an authentication attempt history of user 120.

Remote server 106 may also include an application database 124 for storing various applications for interacting with client computing device 102 over network 108 for purposes other than authentication. Such applications may include applications for authentication, conducting financial transactions and shopping and purchasing items. Remote server 106 may also include an authentication database 126 that may store information for authentication application 122 to use during authentication. Authentication database 126 may also store information about user 120, such as account information, personal information, and an authentication attempt history of user 120.

Figure 2:
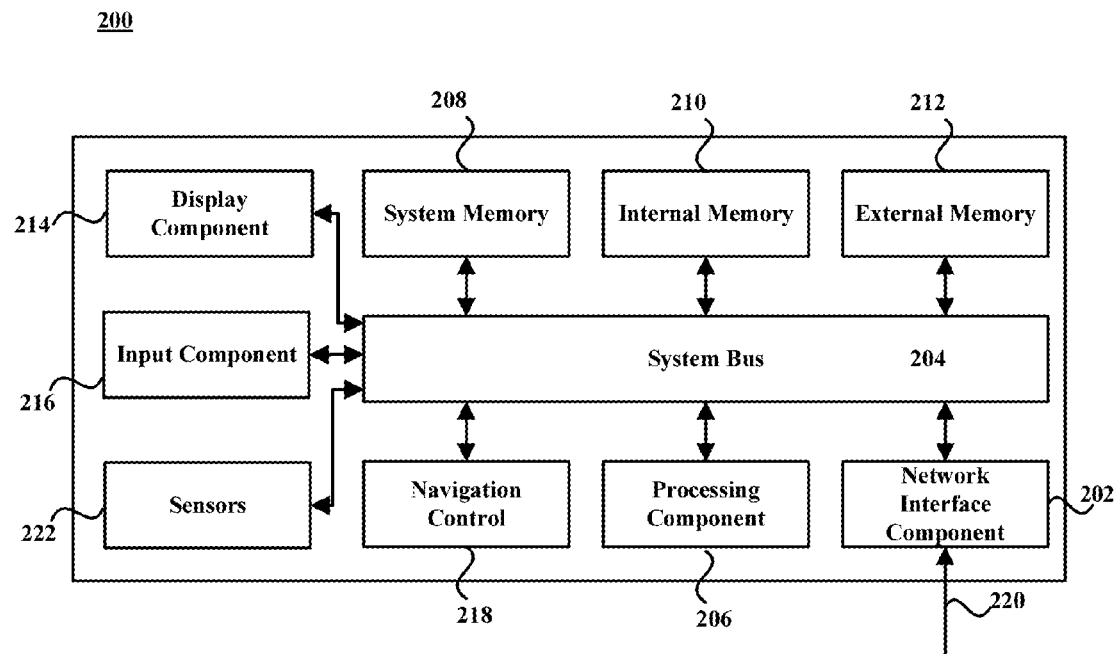
FIG. 2 is a diagram illustrating computing system, consistent with some embodiments.

FIG. 2 is a diagram illustrating computing system 200, which may correspond to either of client computing device 102 or remote server 106, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 106. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 108. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 108.

Consistent with some embodiments, computing system 200 includes a system bus 204 for interconnecting various components within computing system 200 and communication information between the various components. Such components include a processing component 206, which may be one or more processors, micro-controllers, or digital signal processors (DSP), graphics processing unit (GPU), a system memory component 208, which may correspond to random access memory (RAM), an internal memory component 210, which may correspond to read-only memory (ROM), and an external or static memory 212, which may correspond to optical, magnetic, or solid-state memories. Consistent with some embodiments, computing system 200 further includes a display component 214 for displaying information to a user 120 of computing system 200. Display component 214 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 216, allowing for a user 120 of computing system 200 to input information to computing system 200. Such information could include payment information such as an amount required to complete a transaction, account information, authentication information, or identification information. An input component 216 may include, for example, a keyboard or key pad, whether physical or virtual. Computing system 200 may further include a navigation control component 218, configured to allow a user to navigate along display component 214. Consistent with some embodiments, navigation control component 218 may be a mouse, a trackball, or other such device. Moreover, if device 200 includes a touch screen, display component 214, input component 216, and navigation control 218 may be a single integrated component, such as a capacitive sensor-based touch screen.

Computing system 200 may perform specific operations by processing component 206 executing one or more sequences of instructions contained in system memory component 208, internal memory component 210, and/or external or static memory 212. In other embodiments, hard-wired circuitry may be used in place of or in combination with software instructions to implement the present disclosure. Logic may be encoded in a computer readable medium, which may refer to any medium that participates in providing instructions to processing component 206 for execution. Such a medium may take many forms, including but not limited to, non-volatile media, volatile media, and transmission media. The medium may correspond to any of system memory 208, internal memory 210 and/or external or static memory 212. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 220 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 220 and network interface component 202. Communication link 220 may be wireless through a wireless data protocol such as Wi-Fi™, 3G, 4G, HDSPA, LTE, RF, NFC, or through a wired connection. Network interface component 202 may include an antenna, either separate or integrated, to enable transmission and reception via communication link 220. Received program code may be executed by processing component 206 as received and/or stored in memory 208, 210, or 212.

Computing system 200 may also include sensor components 222. Sensor components 222 may include any sensory device that captures information related to the surroundings of client computing device 102. Sensor components 222 may include camera and imaging components, accelerometers, GPS devices, motion capture devices, and other devices that are capable of providing information about client computing device 102, user 120, or their surroundings.

Figure 3:
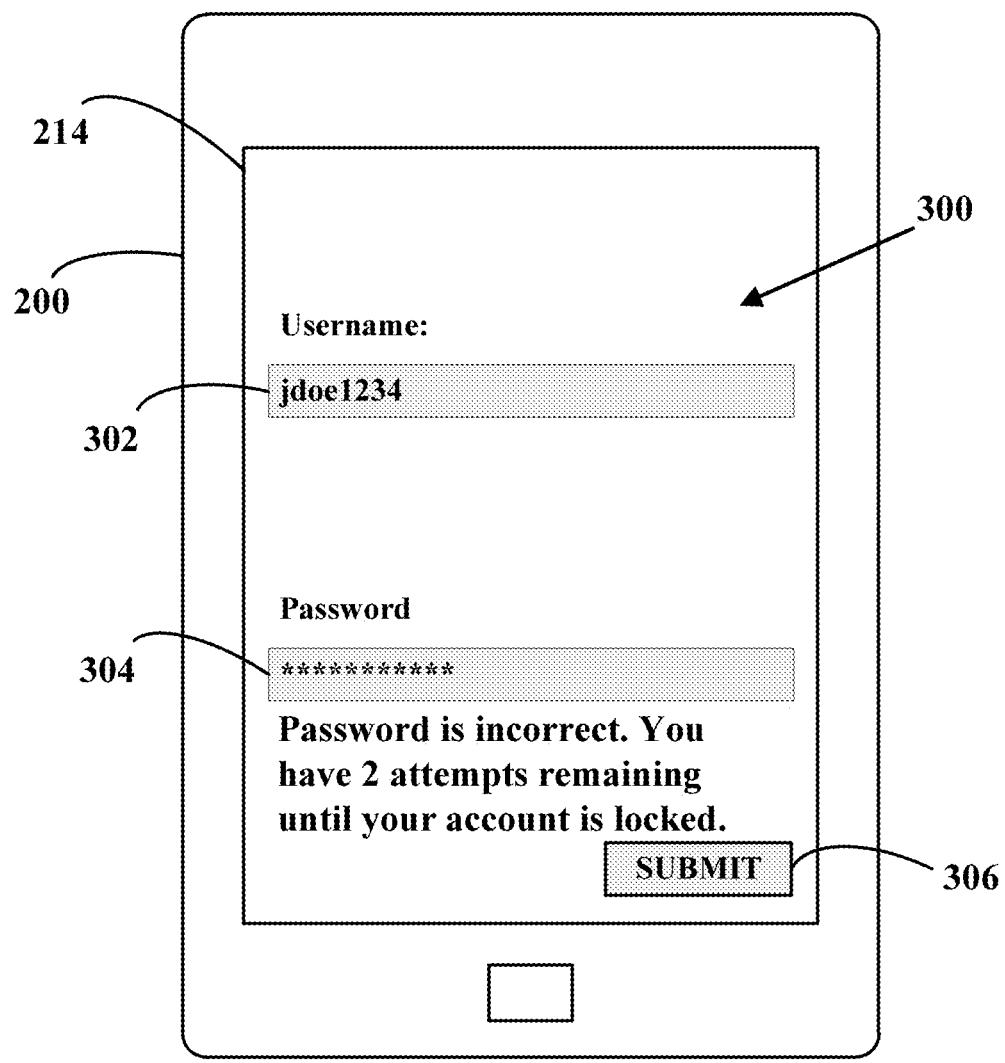
FIG. 3 is a figure illustrating an authentication user interface, consistent with some embodiments.

FIG. 3 is a figure illustrating an authentication user interface, consistent with some embodiments. As shown in FIG. 3, display component 214 of computing system 200 may be configured to display an authentication user interface (UI) 300, consistent with some embodiments. In some embodiments, authentication UI 300 may be displayed on client computing device 102 when client computing device 102 is attempting to authenticate with remote server 106 to access features and services provided by remote server 106. Authentication UI 300 may request credentials such as a username 302 and a password 304. Username 302 may be a user-chosen user name, a remote server-assigned username, or an email address. According to some embodiments, password 304 may be an alphanumeric string, CAPTCHA, or a numeric string such as a personal identification number (PIN). In some embodiments, password 304 may correspond to a biometric identifier, a client-based token, a data file provided on a peripheral such as a smartcard or dongle, a password corresponding to a code, such as a Quick Response (QR) code, or other known type of credential. Consistent with some embodiments, username 302 may be known and stored in any of memories 208, 210, and 212, and may be automatically filled upon accessing authentication UI 300.

Authentication UI 300 may require additional information, consistent with some embodiments. Authentication UI 300 may be an authentication UI 300 provided by remote server 106 through authentication app 122. Authentication UI 300 may also be provided by authentication app 112 separately, or in combination with authentication app 122, when client computing device 102 attempts to access remote server 106.

Authentication UI 300 may further include a "submit" button 306 which, when selected, posts username 302 and password 304 to remote server 106 through network 108. According to some embodiments, submit button 306 may be selected by touching a displayed submit button 306 on a touch screen device. In other embodiments, submit button 306 may be activated by navigating to button 306 with navigation control 218, such as a trackball, mouse, sliding mouse on a soft keyboard, or cursor-moving device and then pressing a physical button associated with navigation control 218.

Consistent with some embodiments, additional information may be posted to remote server 106 over network 108 by selecting submit button 306. For example, the additional information may a cookie, a local object such as a FlashObject, an internet protocol (IP) address of device 200, a device identification (ID) of device 200, a media access control (MAC) address of device 200, or a location of device 200. The posted username 302, password 304, and additional information may collectively be considered as at least one data packet that is posted to remote server 106 through network 108. Consistent with some embodiments, the at least one data packet 312 may be posted using secure sockets layer (SSL) transmission. According to some embodiments, at least one data packet 312 may be encrypted. In some embodiments, at least one data packet 312 may be posted to remote server 106 over network 108 to authenticate to remote server 106 in order to make a payment, receive a payment, or otherwise authorize a transaction or other action to be made in accordance with user's 120 account with remote server 106. Further, at least one data packet 312 may be a single data packet or multiple data packets. Although, FIG. 3 demonstrates one type of authentication UI 300, other authentication UIs may be used, consistent with the disclosed embodiments.

A user 120 entering credentials such as username 302 and password 304 may be permitted an authentication attempt threshold in which to correctly enter username 302 and password 304 until authentication app 112 on client computing device 102 or authentication app 122 on remote server 106 performs a security action, such as locking user 120 out of their account for a predetermined amount of time, requiring user 120 to recover their credentials by answering security questions, or otherwise requiring additional information or credentials to complete the authentication. The security action may be any authentication escalation technique used to increase the assurance that user 120 is who they claim to be after reaching the authentication attempt threshold. As shown in FIG. 3, user 120 has entered an incorrect password 304, and has two remaining attempts until user's 120 account is locked. Accordingly, the example shown in FIG. 3 allows user 120 at least three attempts to successfully authenticate until a security action, such as an account lock, is performed.

Three authentication attempts may be more than is needed for some users, who routinely authenticate successfully on the first or second attempt. For users who routinely authenticate on the first or second attempt, subsequent attempts may be an indication of action being taken by an attacker. However, three authentication attempts may not be enough for some users, who have a history of regularly failing attempts prior to a successful attempt.

FIGS. 4A-4E are user authentication attempt sequences, consistent with some embodiments. Consistent with some embodiments, remote server 106 may store a date and time of successful and failed authentication attempts. Remote server 106 may store these attempts in authentication database 126. Moreover, the successful and failed authentication attempts can be viewed in sequences that cover a predetermined amount of time, such as time $T_x$ which may correspond to a current time, and an earlier time $T_{x-y}$. In some embodiments, the sequences may correspond to time intervals that are relevant to the probability that user 120 will remember their authentication credentials and, thus, successfully authenticate. As shown in FIGS. 4A-4E, during a sequence, user 120 may make many authentication attempts, such as shown in FIGS. 4A, 4B, and 4C, or very few attempts, such as shown in FIGS. 4D and 4E. Moreover, these authentication attempts may result in a successful authentication (S) or a failed authentication (F).

The failed authentications may further be classified as unknown failures and known failures. A known failure may be a failure that is followed up by a success a very short period of time later. As shown in FIG. 4A, a known failure occurs at time $T_{5a}$ as it is followed by a success at time $T_{5b}$. In FIG. 4E, a known failure occurs at time $T_{1a}$ followed by a success at time $T_{1b}$. These failures are referred to as known failures, as they may be indicative of a user who made a typographical error in entering their credentials in authentication UI 300, or the user mistakenly entered the wrong credentials, understood the mistake, and then entered the correct credentials.

The failures that are not followed by a success within a short period of time, or even within the same session, are more difficult to classify and, thus, referred to as an unknown failure. Referring to FIG. 4A, the failure at time $T_2$ is difficult to classify, as it may be due to an attempted attack or a user giving up after a single failure. The successive failures at times $T_3$ and $T_4$ may be indicative of an attempted attack, or a user giving up after two successive failures.

Based on the total number of successes C stored in authentication database 126, a number of successes within a predetermined sequence $C_s$ such as shown in FIGS. 4A-4E, and a recentness R of at least one successful authentication attempt, it may be possible to determine a value or score that may be an estimate of a probability that a user will likely be successful in an authentication attempt. In general, the more recent that user 120 has successfully authenticated to remote server 106, the more likely that user 120 will perform a successful authentication, and the more unlikely that user 120 will fail in an authentication attempt. Moreover, the more often that user 120 has successfully authenticated to remote server 106, the more likely that user 120 will perform a successful authentication at $T_x$. For example, the user shown in FIG. 4A has a lower probability of success than the user shown in FIG. 4B, who is almost always successful, or the users in FIGS. 4C and 4D who have always been successful. Based on the probability of success, the user in FIG. 4B may need less access attempts than the user shown in FIG. 4A. Consequently, a number of authentication attempts before an action is taken may be determined based on the probability of success.

For example, the user shown in FIG. 4A may have an estimated probability of success that is roughly about 25% within the sequence shown in FIG. 4A and, thus, may require at least four or five authentication attempts before remote server 106 performs a security action, since it is more likely that the user will fail authentication on the first attempt, and possibly at least a second attempt as well. The user shown in FIG. 4B, on the other hand, may have an estimated probability of success that is roughly about 86% of based on the sequence shown in FIG. 4B and, thus may only require a maximum of two authentication attempts before a security action is performed, since it is likely that the user will successfully authenticate on the first attempt. Consequently, remote server 106 may be able to determine a maximum number of authentication attempts for a user based on the user's authentication history, including their authentication successes over time and recent successes, so that users more likely to succeed are given fewer attempts and users less likely to succeed are given more attempts.

According to some embodiments, a maximum number of attempts may be determined as a function of C, $C_s$, and R. For example, an estimate of the probability of a successful authentication may be determined as:

$$\frac{R}{C * C_s};$$

or $$R = aC - bC_s,$$

where a and b are predetermined constants. Consistent with some embodiments, the number of attempts may be determined as a rule-based function dependent on C, $C_s$, and R. For example, one rule may be:

if (R>1 month) or (C<4) or (Cs<2), then attempts=4, otherwise attempts=2.

These functions and rules are merely examples that may be used to determine an estimate of the probability of a successful authentication used to determine a number of authentication attempts that user 120 will be permitted or the number of authentication attempts that user 120 will be permitted.

Figure 5:
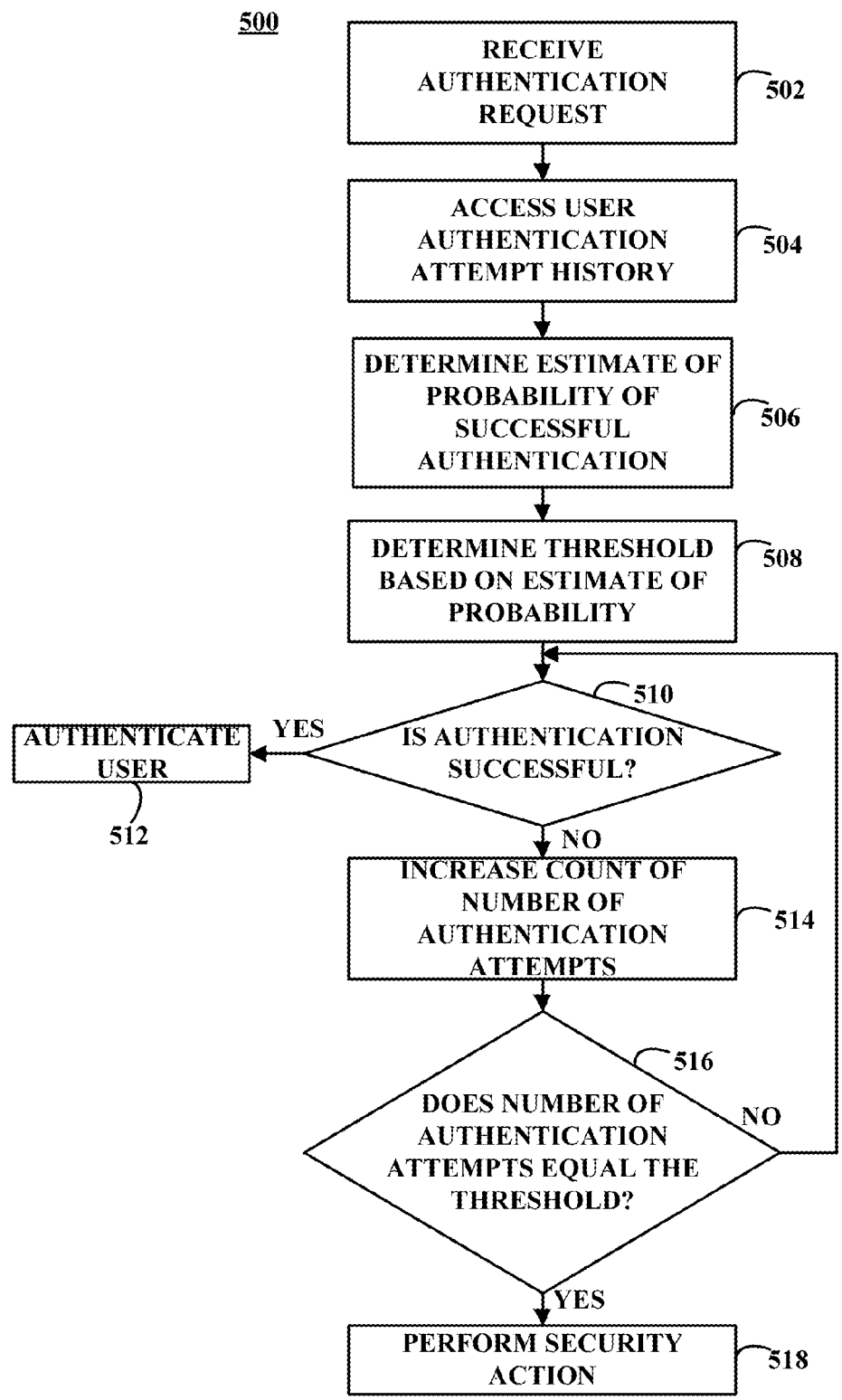
FIG. 5 is a flowchart illustrating a method for determining a number of authentication attempts a user will be provided during a session until a security action is performed, consistent with some embodiments.

FIG. 5 is a flowchart illustrating a method for determining a number of authentication attempts a user will be provided during a session until a security action is performed, consistent with some embodiments. For the purpose of illustration, FIG. 5 will be described with reference to any of FIGS. 1-3 and 4A-4E. The method shown in FIG. 5 may be embodied in computer-readable instructions for execution by one or more processors in processing component 206 such that the steps of the method may be performed by remote server 106. As shown in FIG. 5, method 500 begins when remote server 106 receives a request for authentication (502). Consistent with some embodiments, remote server 106 may receive a request for authentication from client computing device 102 over network 108. The request for authentication may be made by user 120 using client computing device 102 to access services provided by remote server 106. Remote server 106 may then access an authorization attempt history of user 120 (504). In some embodiments, an authorization attempt history of user 120 may be stored in authentication database 126. In some embodiments, an authorization attempt history of user may be stored locally by client computing device 102 and may be provided to remote server 106 along with the request for authentication.

Based at least on the authorization attempt history of user 120, processing component 206 of remote server 106 may determine an estimate of a probability of successful authentication based on at least one sequence of authentication attempts by user 120 (506). Consistent with some embodiments, a sequence of authentication attempts may be one or more authentication attempts made by user 120 to authenticate with remote server 106 over a period of time. In some embodiments, a sequence of authentication attempts may cover a time interval that is relevant to the probability of successful authentication, such as a time interval relevant to whether user 120 will remember their authentication credentials. For example, FIGS. 4A-4E show sequences of authentication attempts by users from a period of time $T_{x-y}$ through $T_x$. Processing component 206 of remote server 106 may determine an estimate of the probability of successful authentication based on a user's 120 successful authentications during the at least one sequence $C_s$, such as shown in FIGS. 4A-4E, a user's 120 successful authentications over their entire authentication history C, and a recentness of at least one success R. According to some embodiments, the estimate of the probability of success may be determined as a function of overall authentication successes C, authentication successes over at least one sequence $C_s$, and a recentness R of at least one success.

Processing component 206 of remote server 106 may then determine an attempt threshold based on the determined estimate of probability (508). The attempt threshold may be determined to be less attempts for users having a higher estimate of a probability of successful authentication, and more attempts for users having a lower estimate of a probability of successful authentication. In some embodiments, the attempt threshold may be between one (1) attempt and ten (10) attempts, with users having a very high estimate of a probability of successful authentication having an attempt threshold of 1 attempt and users having a very low estimate of a probability of successful authentication having an attempt threshold of 10 attempts. In some embodiments, the attempt threshold may be between two (2) attempts and five (5) attempts, with users having a very high estimate of a probability of successful authentication having an attempt threshold of 2 attempt and users having a very low estimate of a probability of successful authentication having an attempt threshold of 5 attempts. Consistent with some embodiments, the attempt threshold may be determined by a rule based on overall authentication successes C, authentication sessions within at least one sequence $C_s$, and a recentness of a success R.

After the threshold has been determined, processing component 206 of remote server may determine if the authentication is successful (510). If the authentication is successful, user 120 may be authenticated to remote server 106 (512). However, if the authentication is not successful, processing component 106 may increase a count of the number of authentication attempts for the session (514). A session may correspond to a period of time in which user is attempting to authenticate with remote server 106 or an access by client computing device 102 of remote server 106 over network denoted by an internet protocol (IP) or media access control (MAC) address of client computing device. According to some embodiments, the period of time may be ten minutes. The number of authentication attempts by user 120 to authenticate to remote server 106 in the session may then be compared to the determined threshold (516). If the threshold is reached, a security action is performed (518). According to some embodiments, performing a security action may include such as locking user 120 out of their account for a predetermined amount of time, requiring user 120 to recover their credentials by answering security questions, or otherwise requiring additional information or credentials to complete the authentication. Consequently, method 500 may provide additional security for users having a higher probability of successful authentication, as a possible attacker will have fewer attempts before a security action is performed. Moreover, method 500 will provide assistance to users who do not authenticate frequently and/or have difficulties in remembering their credentials and, thus, have a lower probability of successfully authenticating to remote server 106.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide systems and methods for determining an authentication attempt threshold based on a probability of successful authentication. In particular, embodiments described herein may determine an authentication attempt threshold by analyzing a recentness of a successful authentication, a number of successful authentication attempts over a predetermined sequence, and a number of overall successful authentication attempts. Consequently, embodiments provided herein may provide additional security to users who frequently authenticate, while giving a few more attempts to user who do not frequently authenticate without significantly decreasing security. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An authentication system, comprising:
a non-transitory memory; and
one or more hardware processors coupled to the non-transitory memory and configured to read instructions from the non-transitory memory to cause the system to perform operations comprising:
receiving an authentication request from a user;
accessing an authentication attempt history for the user;
identifying a sequence of authentication attempts in the authentication attempt history, the sequence of authentication attempts occurring over a predetermined amount of time;
determining a length of time since a most recent successful authentication attempt by the user;
determining an estimate of a probability of successful authentication based on a function that computes a ratio of the length of time since the most recent successful authentication and a product of a number of successful authentications in the sequence of authentication attempts and a number of successful authentications in the authentication attempt history;
determining an authentication attempt threshold based on the probability;
determining whether the authentication request is successful; and
when the authentication request is not successful:
increasing a count of a number of failed authentication attempts; and
performing a security action when the count equals the authentication attempt threshold.

2. The system of claim 1, wherein the authentication request is received from a user device of the user in communication with the system over a network.

3. The system of claim 1, wherein the authentication request includes credentials associated with the user.

4. The system of claim 1, wherein the predetermined amount of time corresponds to a time interval of relevance to the probability of successful authentication.

5. A non-transitory machine-readable medium having stored thereon instructions executable to cause a machine to perform operations comprising:
receiving an authentication request from a user;
accessing an authentication attempt history for the user;
identifying a sequence of authentication attempts in the authentication attempt history, the sequence of authentication attempts occurring over a predetermined amount of time;
determining a length of time since a most recent successful authentication attempt by the user;
determining an estimate of a probability of successful authentication based on a function that computes a ratio of the length of time since the most recent successful authentication and a product of a number of successful authentications in the sequence of authentication attempts and a number of successful authentications in the authentication attempt history;
determining an authentication attempt threshold based on the estimate of probability;
determining whether the authentication request is successful; and
when the authentication request is not successful:
increasing a count of a number of failed authentication attempts; and
performing a security action when the count equals the authentication attempt threshold.

6. The machine-readable medium of claim 5, wherein the authentication request is received from a user device of the user in communication with the machine over a network.

7. The machine-readable medium of claim 6, wherein the authentication request includes credentials associated with the user.

8. The machine-readable medium of claim 5, wherein the predetermined amount of time corresponds to a time interval of relevance to the probability of successful authentication.

9. The machine-readable medium of claim 5, wherein performing the security action comprises locking the user out of an account.

10. An authentication system, comprising:
a non-transitory memory; and
one or more hardware processors coupled to the non-transitory memory and configured to read instructions from the non-transitory memory to cause the system to perform operations comprising:
receiving an authentication request from a user;
accessing an authentication attempt history for the user;
identifying a sequence of authentication attempts in the authentication attempt history, the sequence of authentication attempts occurring over a predetermined amount of time;
determining a length of time since a most recent successful authentication attempt by the user;
determining an estimate of a probability of successful authentication based on a function that subtracts a first constant times a number of successful authentications in the sequence of authentication attempts and a second constant times a number of successful authentications in the authentication attempt history from the length of time since the most recent successful authentication;
determining an authentication attempt threshold based on the estimate of the probability;
determining whether the authentication request is successful; and
when the authentication request is not successful:
increasing a count of a number of failed authentication attempts; and
performing a security action when the count equals the authentication attempt threshold.

11. The system of claim 10, wherein the authentication request is received from a user device of the user in communication with the system over a network.

12. The system of claim 10, wherein the authentication request includes credentials associated with the user.

13. The system of claim 10, wherein the predetermined amount of time corresponds to a time interval of relevance to the probability of successful authentication.

14. The system of claim 10, wherein performing the security action comprises locking the user out of an account.

15. The system of claim 1, wherein performing the security action comprises locking the user out of an account.

* * * * *